US007000834B2

(12) United States Patent
Hind et al.

(10) Patent No.: US 7,000,834 B2
(45) Date of Patent: Feb. 21, 2006

(54) METHOD TO ADDRESS SECURITY AND PRIVACY ISSUE OF THE USE OF RFID SYSTEMS TO TRACK CONSUMER PRODUCTS

(75) Inventors: John R. Hind, Raleigh, NC (US); James M. Mathewson, II, Chapel Hill, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 09/790,104

(22) Filed: Feb. 21, 2001

(65) Prior Publication Data

US 2002/0116274 A1  Aug. 22, 2002

(51) Int. Cl.
*G06F 19/00* (2006.01)
(52) U.S. Cl. ...................... 235/385; 235/487
(58) Field of Classification Search ............ 235/492, 235/435, 385, 381, 378, 451, 380, 382.5, 235/375, 472.02, 4; 340/572.1, 10.4, 10.5–10.52, 340/5.25, 5.61, 5.74; 705/23, 20; 700/115
See application file for complete search history.

(56) References Cited

U.S. PATENT DOCUMENTS

| 4,807,140 | A | * | 2/1989 | Saulnier ................. 700/116 |
| 4,862,501 | A | * | 8/1989 | Kamitake et al. .......... 713/172 |
| 5,055,659 | A | * | 10/1991 | Hendrick et al. ........ 340/10.51 |
| 5,257,011 | A | * | 10/1993 | Beigel ................. 340/572.1 |
| 5,499,017 | A | * | 3/1996 | Beigel ................. 340/572.1 |
| 5,963,134 | A | | 10/1999 | Bowers et al. .......... 340/572.1 |
| 6,145,749 | A | * | 11/2000 | Thuringer et al. ......... 235/492 |
| 6,216,014 | B1 | * | 4/2001 | Proust et al. ............ 455/558 |
| 6,252,508 | B1 | * | 6/2001 | Vega et al. ............ 340/572.1 |
| 6,375,082 | B1 | * | 4/2002 | Kobayashi et al. ........ 235/492 |
| 2004/0074975 | A1 | | 4/2004 | Gundlach et al. ......... 235/492 |

FOREIGN PATENT DOCUMENTS

| JP | PUPA60-207939 | 10/1985 |
| JP | PUPA09-231468 | 9/1997 |
| JP | PUPA2000-229547 | 9/2000 |
| JP | PUPA2001-043112 | 2/2001 |
| JP | 2002279390 A * | 9/2002 |
| WO | 0016570 | 3/2000 |
| WO | 0021032 | 4/2000 |
| WO | 0039741 | 7/2000 |

OTHER PUBLICATIONS

*Radio Frequency Identification—RFID (a basic primer)*, Document Version: 1.11, Sep. 28, 1999, http://www.aimglobal.org/technologies/rfid/resources/papers/rfid_basics_primer.htm, Jan. 23, 2001.
"California Lawmaker Introduces RFID Bill", by Alorie Gilbert, Staff Writer, CNET News.com, http://news.com.com/2100-1014-5164457.html, printed Feb. 25, 2004.

\* cited by examiner

*Primary Examiner*—Jared J. Fureman
*Assistant Examiner*—Daniel Walsh
(74) *Attorney, Agent, or Firm*—Yee & Associates, P.C.

(57) ABSTRACT

A method, system, apparatus, and computer program product for using radio-frequency identification (RFID) technology to store product information in tags attached to items of merchandise is disclosed. The RFID tagging scheme of the present invention prevents tampering with stored information, global tracking of customers and their purchased items, and pricing mistakes made at the point of sale.

57 Claims, 12 Drawing Sheets

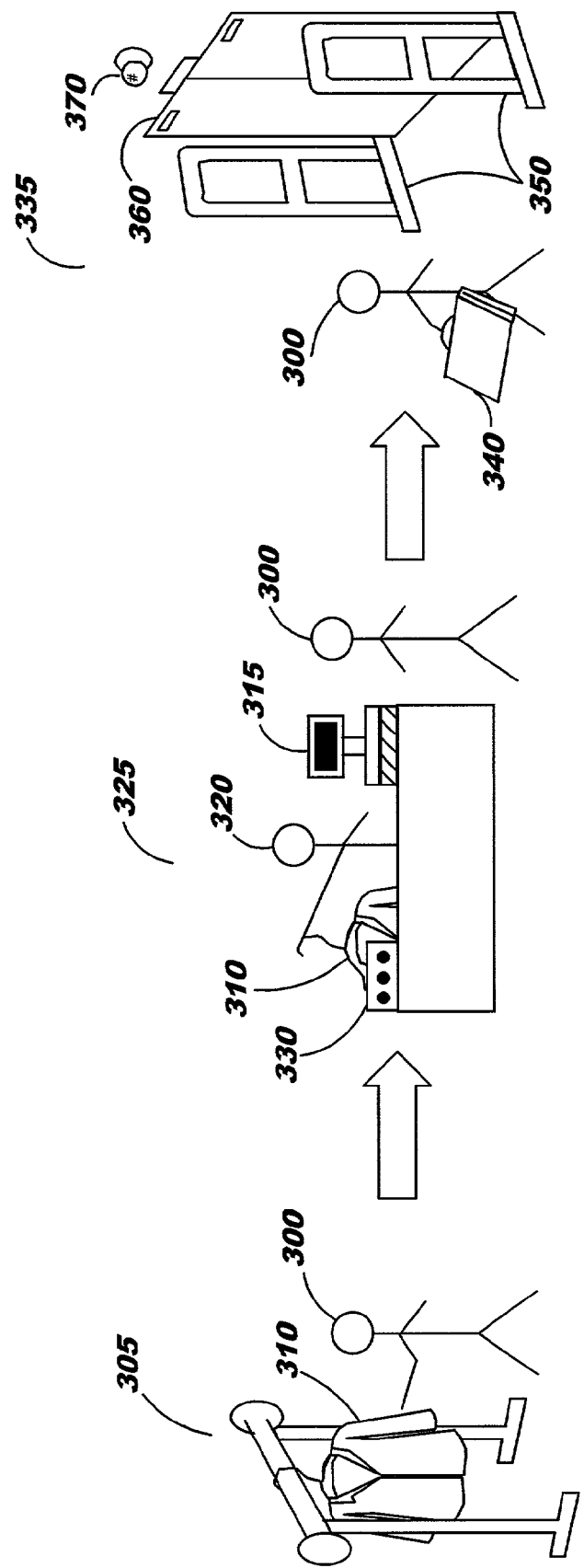

FIG. 4B

| TYPE 412 | LENGTH 414 | VALUE 416 |
|---|---|---|
| READ ONLY | 10 | 53191 79234 |
| READ ONLY | 4 | $19.95 |
| SHORT REWRITE | 3 | 1-30-01 #36 |

- 402 UPC
- 404 LIST PRICE
- 406 TRACKING #

FIG. 6

```
#define MAXLEN 3  — 675
                       — 622              — 626
enum rules { undef, read_only, short_rewrite, read_write };
                  — 621           — 624
struct record {
        char *type; — 615
        int length; — 630
        char data[256]; — 640
};
extern struct record **memory; — 642
                           — 652
void write_record(struct record *new) { struct record *old; — 656
        rules old_rule; — 620

/* Find the old item being replaced */
        old = findItemByType(memory, new->type); — 657

/* If there is no old item of that type,
           make a new one */
        If(old == NULL) {
                old = addNewType(memory, new->type); — 658
        }
        old_rule = findRuleByType(old->type); — 659

/* If the record is read only
           do not write to it */
        if(old_rule == read_only) return; — 660

/* If the record is partially rewriteable, make the length
           short */
        if(old_rule == short_rewrite) rec->length = MAXLEN; — 670

/* If the record is unlimited read/write, adjust the length
           to fit the data */
        if(old_rule == read_write) rec->length = len; — 680

/* copy the data */
        memcpy(rec->data, new->data, rec->length); — 690
}
```

(650 labels the write_record function block)

FIG. 7

```
void read_records() {
    int i;
    for(i=0; memory[i] ! = NULL; i++) {
        xmit_type(memory[i]->type);     730
        xmit_length(memory[i]->length); 740
        xmit_data(memory[i]->data);     750
    }
}
```

700, 720

METHOD TO ADDRESS SECURITY AND PRIVACY ISSUE OF THE USE OF RFID SYSTEMS TO TRACK CONSUMER PRODUCTS

BACKGROUND OF THE INVENTION

1. Technical Field

The present invention relates generally to the area of identification devices. More particularly, the present invention provides a radio-frequency identification system with features to reduce a party's ability to tamper with the identification devices or to track the identification devices on a global scale. The invention is particularly useful as a theft/fraud preventive in the context of a retail store or as a means of inventory control when accuracy is critical, such as with an inventory of pharmaceuticals in a clinical setting.

2. Description of Related Art

Radio-frequency identification (RFID) technology provides an inexpensive and simple way to mark physical objects with machine-readable information. In this application, the term "machine-readable" refers to those media that are readable only by a machine; such media are almost always machine written as well. RFID has many advantages over other machine-readable information media. Unlike magnetic media, RFID tags do not require a reader to make contact with the tag to read the information out. Unlike bar codes, RFID tags can be easily rewritten and do not require that the tag be visible when read.

RFID tags are electronic devices. They are generally composed of an antenna and an integrated circuit. The antenna is used for sending and receiving data as radio-frequency signals. The integrated circuit contains non-volatile memory, modulation circuitry (for facilitating radio communication), and control logic. Thus, RFID tags are memory devices that are read and written to using radio-frequency signals.

RFID tags are passive devices. That means that they need not include a power supply. RFID tags receive all the power they need to operate from the radio-frequency signal emitted by RFID tag readers or writers. This makes it possible to manufacture RFID tags of very small size. Advancements in RFID tag fabrication technology have also made it possible for RFID tags to be manufactured at very small sizes. For instance, early RFID tags used large inductive antennas; more modern tags use capacitive antennas, which can be printed on packaging using conductive ink in a way that blends in with other printed marking. With this new antenna manufacturing technique the integrated circuit can simply be glued on to the antenna looking, perhaps, like just a "dot" in the product logo or other printing.

RFID tags, because of their small size, are easily incorporated into other products. For instance, RFID tags can be easily sewn into clothes or attached to product packaging, or incorporated into product markings. This makes them prime candidates for storing product information, such as universal product codes (UPCs) or price information, in a retail product, much as bar codes do for supermarket products today.

Another use for RFID tags, one that has already gained wide acceptance, is to use RFID tags as a theft detection system. In such a system, RFID-tagged merchandise, when transported past a reader device in front of the exit to a store, triggers an alarm, unless the tag has been reprogrammed at the point-of-sale when the item is purchased.

Three problems with the widespread use of RFID tags on merchandise occur, however. The first is that many current RFID tags can be readily tampered with. Current RFID tags generally impose no access control requirements and may be read from and written to freely. Thus, a store employee with less than honorable intentions might reprogram the tag on a particular piece of merchandise such that when the employee buys the merchandise from the store, the employee is undercharged.

The second problem is one that also occurs with some frequency with bar codes. Sometimes the point-of-sale terminal at which an item is being purchased is programmed with incorrect price information. This situation can result in the customer being overcharged or even undercharged. Because the RFID tag is machine-readable only, it provides no price information to the cashier. Thus, there is often no way for the cashier to detect a mistake in a customer's receipt.

The third problem is that the widespread use of RFID tags on merchandise such as clothing would make it possible for the locations of people, animals, and objects to be tracked on a global scale—a privacy invasion of Orwellian proportions.

SUMMARY OF THE INVENTION

Accordingly, it would be beneficial if there were a method of storing product information in a radio-frequency identification tag attached to the product in such a way as to avoid the problems associated with tampering of tags. It would also be desirable to avoid the problems associated with the tracking of RFID tags on a global scale. It would also be desirable to implement an RFID system that protects against pricing errors at the point-of-sale.

The present invention achieves these goals by employing a novel method for managing the storage of product information in an RFID tag. In a preferred embodiment of the invention, product information is divided into three categories: a universal product code (UPC), a list price, and a tracking number. Each of these categories is stored as a triplet. The triplet includes a type (which denotes an access control rule associated with the category), a value (containing the primary information stored in the category), and a length (of the value).

The UPC and list price categories are stored as read-only-type data, to prevent tampering, and the tracking number is stored under a "short-update" type. The short update type allows a globally-unique tracking number used for inventory purposes to be overwritten with a globally non-unique number at the point-of-sale to prevent global tracking. Finally, point-of-sale pricing mistakes are easily detected by comparing the read-only list price stored in the RFID tag with the price stored in the point-of-sale terminal. If the two prices are widely divergent, then the attending cashier is alerted to the discrepancy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts, in storyboard format, the use of the present invention's RFID technology in a retail context.

FIG. 4B is a diagram depicting the modified memory contents of a preferred embodiment of the present invention.

FIG. 6 is a C language representation of the process of writing information to an RFID tag of the present invention.

FIG. 7 is a C language representation of the process of reading information from an RFID tag of the present invention.

DETAILED DESCRIPTION OF THE PREFERRED EMBODIMENT

Figure 1:
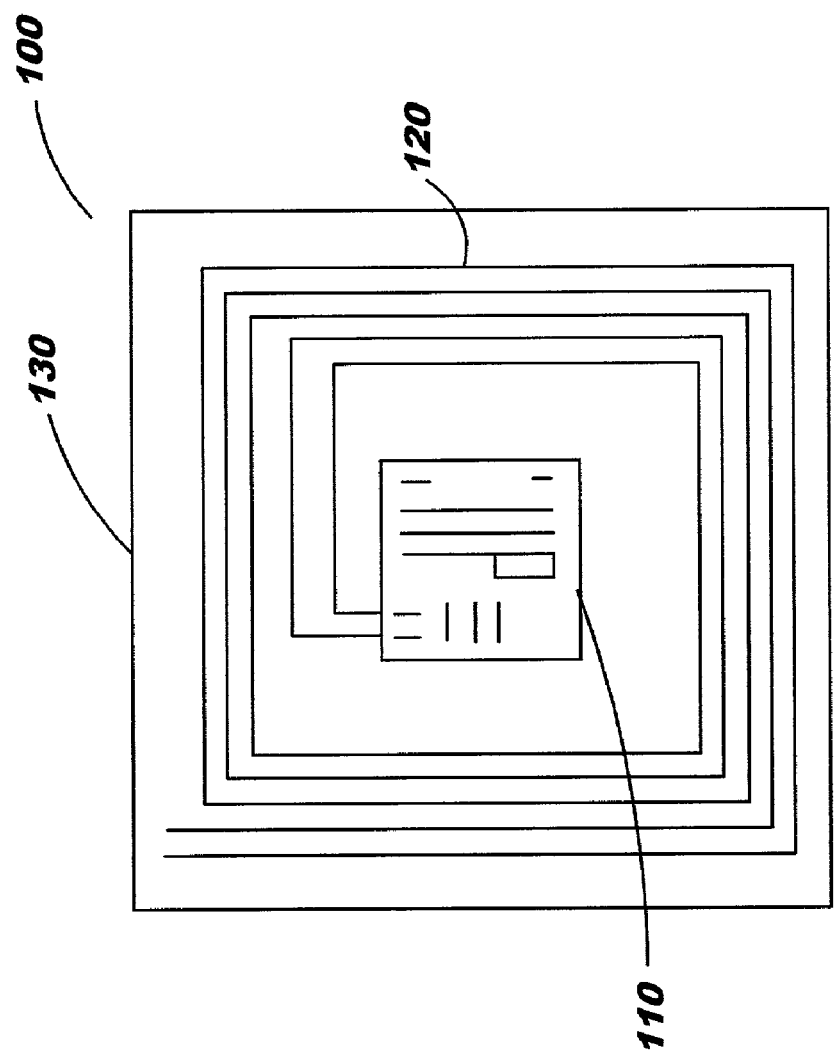
FIG. 1 depicts a typical radio-frequency identification (RFID)tag.

FIG. 1 is an example of a radio-frequency identification (RFID) tag 100 (not to scale). The tag 100 includes an integrated circuit 110 containing non-volatile memory, logic circuitry, and communications circuitry. This integrated circuit is attached to an antenna 120, which in this example is implemented as an inductor coil. All of this electronic equipment is fabricated onto a substrate, which in this example is a clear, flexible film.

This tag 100 may be written to or read from by subjecting it to a radio-frequency signal. The integrated circuit 110 reads the radio-frequency signal from the antenna 120 and interprets the signal as a command to read or write data to or from memory located on the integrated circuit.

Note that there is no power supply located on the tag 100. The integrated circuit 110 collects all of its power from the energy in the radio-frequency signal. This allows the tags to be easily and inexpensively produced and allows them to be used in a variety of environments where a device that had to supply its own power could not be used. An example of such an environment would be one in which the bulk of a power supply would be prohibitive.

RFID tags provide a ready form of identification or marking of an object. Identification information can be written to an RFID tag, where it becomes readable by any compatible reader. The kinds of information that may be stored in an RFID tag are essentially all of the same kinds of information that may be stored in a computer or other data processing system. Thus, an RFID tag identifying an item of merchandise, for instance, may include such information as the name of the product, price information, a serial number, a UPC (Universal Product Code), or any other data a merchant or manufacturer may choose to include.

Figure 2:
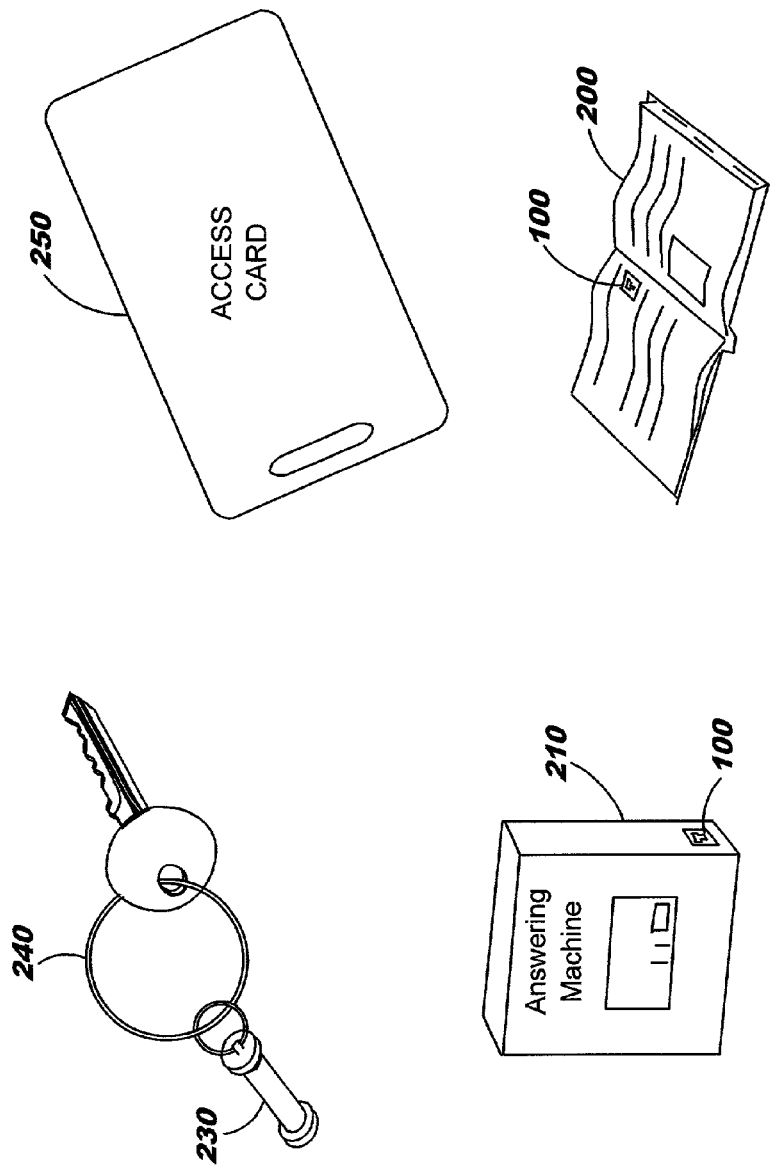
FIG. 2 depicts common physical embodiments and applications of RFID technology.

As FIG. 2 demonstrates, RFID technology can take many forms and be used in many contexts. A tag 100, such as the one in FIG. 1 is readily mounted to or incorporated into a variety of products. A tag 100 may be mounted to an item of product packaging 210 or placed within the pages of a book 200.

Although not tags in the usual sense of the word, a number of access control and identification devices that do not resemble the flat tag also fall into the same category. Among these are the RFID key fob 230, which is an RFID tag that is attached to a key ring 240, and the RFID card 250, which is often used as an access control device in parking garages or other restricted areas.

These examples are not intended to be exhaustive of the applications or forms of RFID tags. Many other applications and physical forms of the technology are known to exist or are being developed.

FIG. 3 shows, in a storyboard format, a high level overview of how the present invention uses RFID tags in a retail context. In the first frame 305, a retail customer 300 selects a product 310, in this case a coat, to which an RFID tag is attached. The RFID is preferably attached to the product in such a way as to prevent an unsuspecting customer or a would-be shoplifter from finding and removing the tag. In the case of a coat, the tag could be sewn into the lining, for instance.

In the second frame 325, the customer 300 brings the product 310 to a point-of-sale terminal 315. The attending cashier 320 scans the product 310 with a tag reader/writer 330. The tag reader/writer 330 reads a product identification code (such as a UPC) and an inventory tracking code from the tag attached to the product 310. The point-of-sale terminal 315 then adds the product 310 to the customer's 300 order and overwrites the tracking information with the tag reader/writer 330 so as to signify that the product 310 has been purchased.

In the third frame 335, when the customer 300 leaves the store with the customer's 310 tagged items of merchandise 340, RFID readers 350 placed in front of the exit 360 scan the tagged items 340 to ensure that they have been paid for. If the customer's items 340 were not paid for (in other words, if they retain their original tracking numbers), a theft alarm 370 is sounded.

Figure 4A:
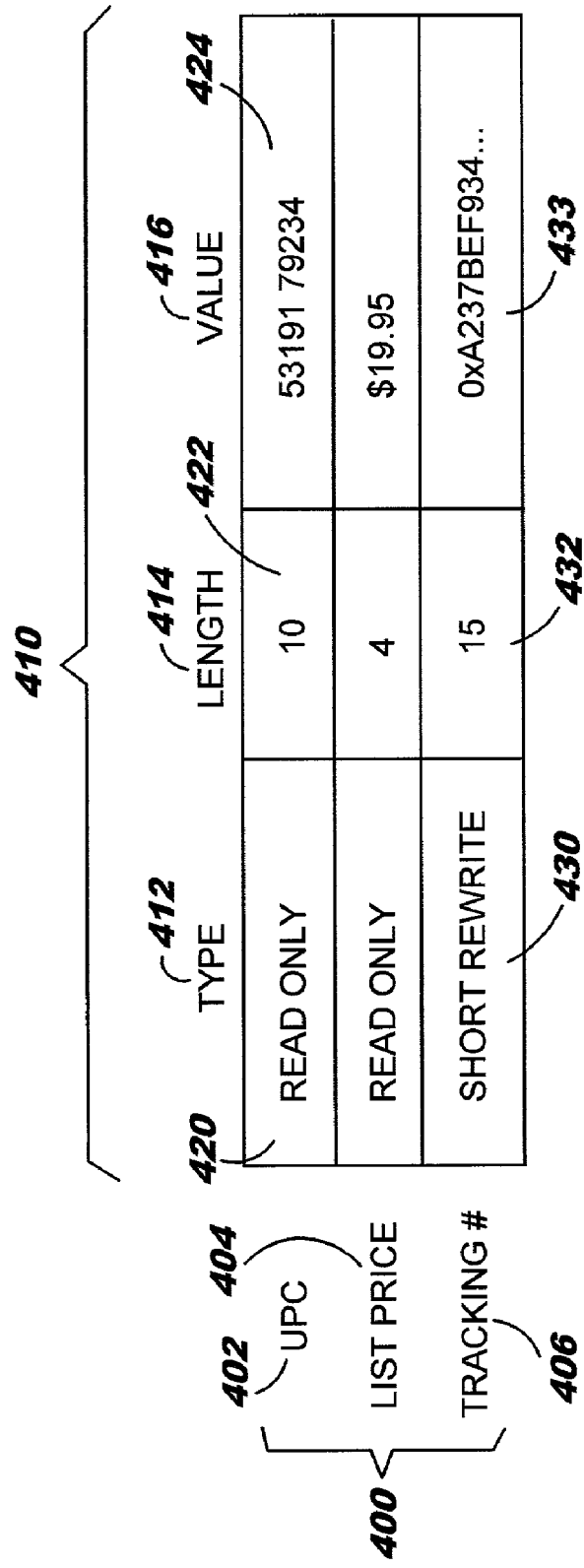
FIG. 4A is a diagram depicting the memory contents of a preferred embodiment of the present invention.

FIG. 4A is a diagram of the memory contents of an RFID tag attached to a product 310 as in FIG. 3, in accordance with a preferred embodiment of the present invention. Three basic pieces of information are stored in the tag. These are represented by rows 400 in the diagram. The UPC 402 identifies which product (among differing products) is attached to the tag. The list price 404 gives an indication of the manufacturer's or retailer's suggested retail price for the item; this allows a point-of-sale terminal to detect gross errors in its pricing information by comparing its information to the list price, thus preventing a customer being mistakenly over- or under-charged for an item. The tracking number 406 uniquely identifies the particular item of merchandise attached to the tag as among other items in the store or as among other items on a global scale (all items of merchandise in the world, for instance).

Each of the three pieces of information is represented as a triplet comprising a type 412, a length 414, and a value 416. The type field 412 indicates to what extent the information stored on the tag may be changed. For instance, the UPC 402 is stored on the tag in FIG. 4A using the read-only 420 type. That means that the UPC 402 cannot be changed. Storing the UPC 402 as a read-only value keeps a would-be con artist (such as a retail employee with criminal leanings) from changing a product's UPC 402 to that of a less expensive product, so as to be charged less at the point-of-sale terminal 315 (in FIG. 3). Other possible types include unlimited read/write and short rewrite, which will be discussed later in regard to FIG. 4B.

The length field 410 denotes how long the information stored in the value field 416 may be. For instance, in FIG. 4A, the UPC length field 422 limits the size of the UPC value field 424 to 10 bytes.

In FIG. 4A, the tracking number 406 is stored with short-rewrite 430 type. This means that if an attempt to rewrite the tracking number value 433 is made, the tracking number length 432 is shortened to some predetermined length, and only a new tracking number of length equal to the predetermined length will be stored.

FIG. 4B demonstrates what happens to the memory when a short-rewrite type data field is rewritten to. In FIG. 4B, the tracking number length 432 has been shortened to three bytes, and a value of no more than three bytes length has been stored as the tracking number value 433. Here, it is the date and order of sale (the thirty-sixth sale on Jan. 30, 2001). Limiting the size of the rewritten information provides protection to the customer against global tracking.

Figure 4C:
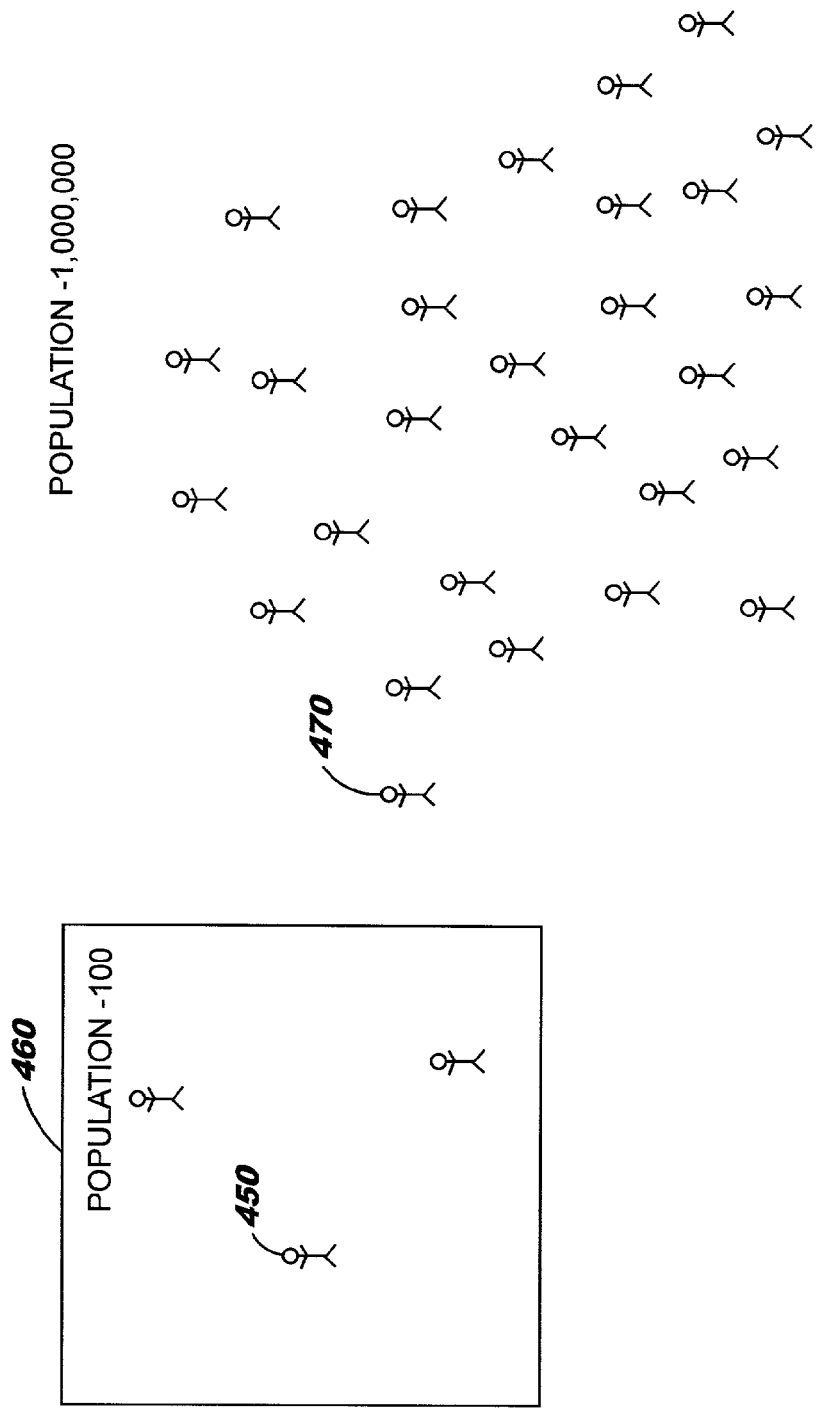
FIG. 4C is a diagram depicting how a short-update write-access control rule allows for local tracking, but prevents global tracking.

FIG. 4C demonstrates how this protection against global tracking works. When a customer 450 is located within a store 460 and is carrying something storing a small tracking number containing largely non-unique information (such as a date, along with a few digits of tracking number), that customer's 450 location may be tracked throughout the store. Even though the amount of tracking information may be small, because there are few others within the store, there is little likelihood that two customers having the same number are in the same store. Thus, the customer 450 can be uniquely identified and readily tracked.

A customer 470 who has left the store holding a small tracking number, however, is not easily distinguishable from the rest of the population. If the customer's 470 tracking number is limited in size, there will be (many) others with the same tracking number. Thus, it will become difficult to uniquely identify and track the customer 470.

Figure 5:
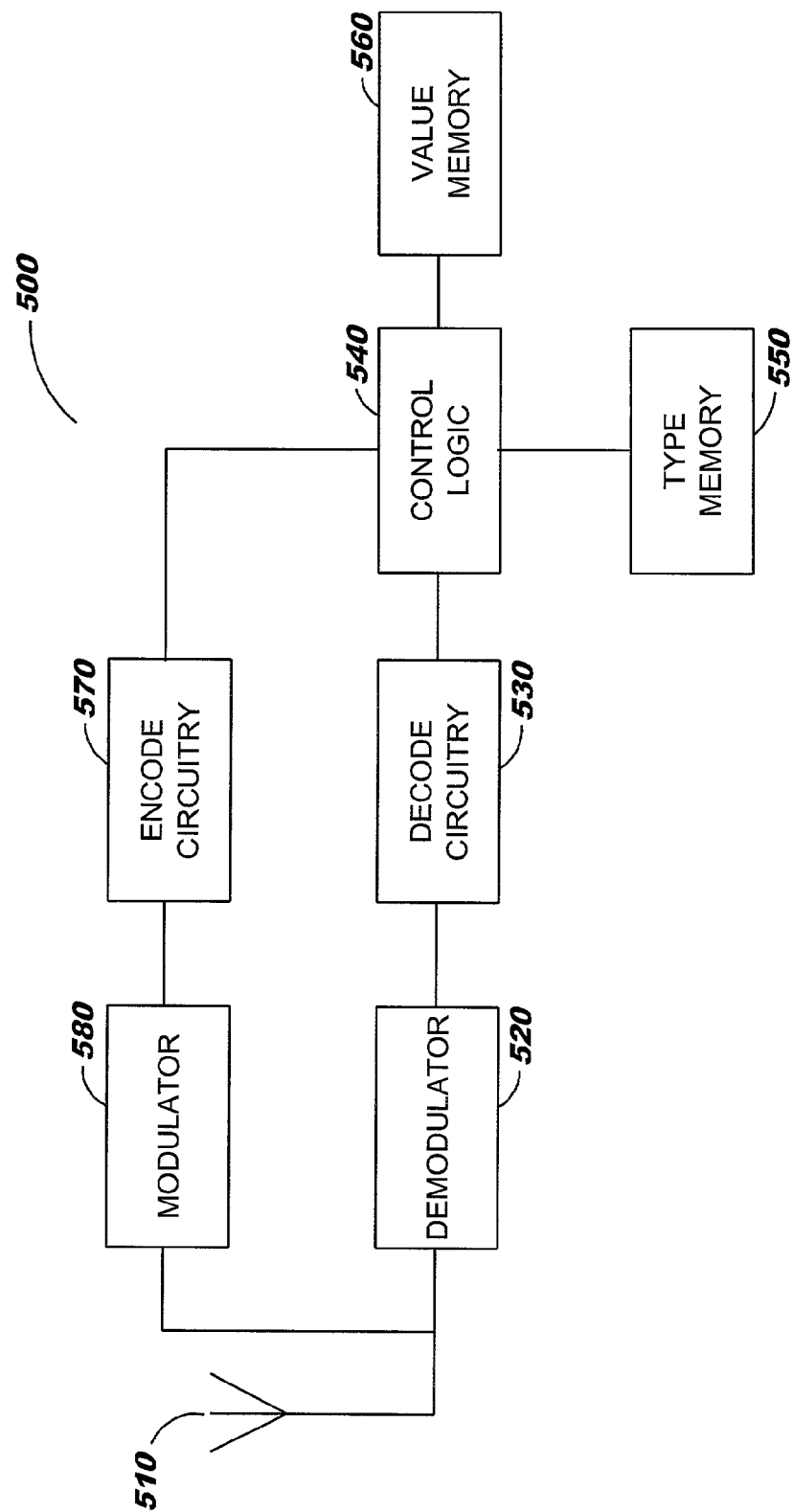
FIG. 5 is a block diagram of a preferred embodiment of the present invention.

FIG. 5 is a block diagram of a preferred physical embodiment 500 of the RFID tags of the present invention. An antenna 510 receives a radio-frequency signal from a tag-reading or tag-writing device. The signal passes to a demodulator circuit 520, which separates the information-bearing component of the signal from a carrier signal. Decode circuitry 530 converts the output of the demodulator 520 into digital data and instructions that the control logic 540 can understand.

The control logic 540 interprets the instructions given to it to either read or write to/from the value memory 560, which stores the identification information (UPC, list price, etc.) and the length of each element of such information. The control logic 540, is governed, however, by the contents of the type memory 550, which stores the contents of the type field 412, found in FIG. 4A.

Thus, when attempting to write a data to a location in value memory 560, the control logic 540 first checks the type memory 550 to see if the data may be written to the location and if so, how much data may be written there. If the location may be written to, the data and the proper length are stored in the value memory 560.

When an item of data is read, the control logic 540 first reads the length of the data item from the value memory 560, then reads that length of data from the value memory 560. The control logic 540 then sends that data to encode circuitry 570, which converts the data into a form suitable for transmission over a radio-frequency communications channel. The converted data then passes to a modulator 580, which modulates a carrier signal to include the converted data. The modulated signal is then transmitted as radio waves through the antenna 510.

FIG. 6 shows a C language representation 600 of the process of writing a record to memory within an RFID tag of a preferred embodiment of the present invention. Those skilled in the art will appreciate that this representation is only an example of how the control logic 540 of FIG. 5 can be implemented in software, using a microcontroller, microprocessor, or digital signal processor as the physical embodiment of the control logic 540. Those skilled in the art will also appreciate that such a software implementation is not limited to the use of the C language but may be implemented in any of a variety of computer languages, including but not limited to C++, Java, Forth, Lisp, Scheme, Python, Perl, and Assembly Languages of all kinds. Further, those skilled in the art will recognize that the control logic 540 need not be implemented as software running on a microcontroller, microprocessor, digital signal processor, or other stored-program data processing device; the control logic 540 may as easily be implemented using application-specific circuitry (such as digital logic circuitry) with no stored program of instructions.

FIG. 6 demonstrates an alternative embodiment of the invention in which the "type" portion of a data triplet stores the category of information (UPC, price, etc.) being stored, rather than the write-access rule (read-only, short-rewrite, etc.). In this embodiment, the write access rules are associated with each category of information (UPCs are read-only, tracking numbers are short-rewrite, etc.). Thus, whereas in the previous figures, the type field denoted the write access rule explicitly, the type field in FIG. 6 denotes the write access rule implicitly, as a result of the association between each data category and an access control rule.

In the C language representation 600, the data triplets (type, length, value) are stored together in a struct data structure 610. The type 615 is stored as a character string. The length 630 is stored as an integer, and the value is stored as an array of bytes (chars) 640.

The data triplets are stored in the memory of the RFID tag. In FIG. 6, that memory is organized by using an array of pointers to data triplets (structs) 642. Each element in the array is a pointer that points to a data triplet stored in a struct.

The writing process is embodied in the function "write_record" 650. A data triplet struct 652 is passed into the function 650. The struct 652 contains the new information to be written, the length of the information, and the desired type to associate with the information. The function 650 defines two variables: a pointer that will point to an existing struct of the same type ("old") 656 and a variable 620 for storing the write access control rule associated with the existing struct 656.

The execution of the function 650 is as follows: In line 657, an existing struct of the same type as the new information 652 is searched for in memory using a function "findItemByType" (not listed). In line 658, if no such existing struct is found, a function called "addNewType" (not listed) is called to make a new struct of the new type. The existing struct or new struct, accordingly, is pointed to by variable "old" 656.

In line 659, the write access control rule governing the type of the struct pointed to by "old" 656 is found and stored in "old_rule" 620. In line 660, if "old_rule" 620 is "read_only" 622, then exit the function, as the struct pointed to by "old" 656, being of read-only type, may not be written to. In line 670, if "old_rule" is "short_rewrite," then a predetermined length, MAXLEN, is substituted for the length stored in the struct pointed to by "old" 656. MAXLEN is defined in this example to be three bytes, per line 675. In line 680, if "old_rule" is "read_write," then the entirety of the data stored in the passed-in struct 652 may be stored in the struct pointed to by "old" 656; thus the length stored in the struct pointed to by "old" 656 is adjusted to the length 654 the information to be stored.

Finally, in line 690, the data portion of the passed-in struct 652 is copied into the value array 640 of the struct 656.

FIG. 7 depicts a C language function "read_record" 700 for reading values from the RFID tag. A counted loop 720 is set up to iterate through each data triplet struct in memory. Each iteration through the loop, the type 730, length 740, and data contents 750 are transmitted.

Figure 8:
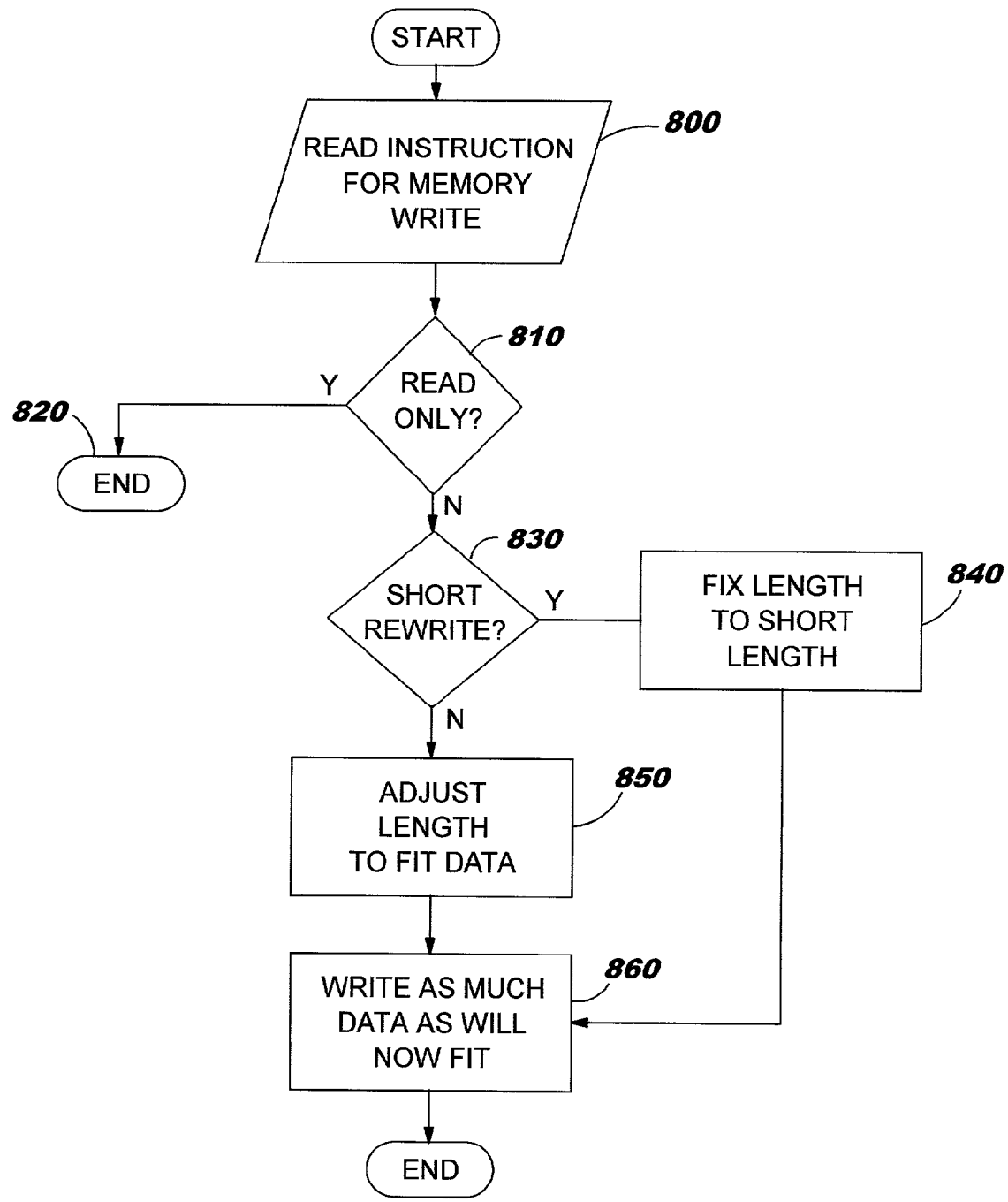
FIG. 8 is a flowchart depicting the process of writing information to an RFID tag of the present invention.

FIG. 8 is a flowchart representation of the process the control logic 540 goes through in writing an item of data to the memory of an RFID tag in a preferred embodiment of the present invention. First the instruction to write a particular item of data to a particular location within the memory is received (step 800). If the location in question is a read-only location (step 810), the process ends (step 820), since no data is allowed to be written. If not, however, the control logic 540 must then check to see if the location is governed by a short-rewrite rule (step 830). If it is, then the length associated with the memory location is shortened (step 840), pursuant to the short-rewrite rule. If not, then the length associated with the memory location is adjusted to fit the new item of data (step 850). Finally, as much of the new item of data as will fit, given whichever length adjustment is performed (step 840 or step 850), is written to the memory location (step 860).

Figure 9:
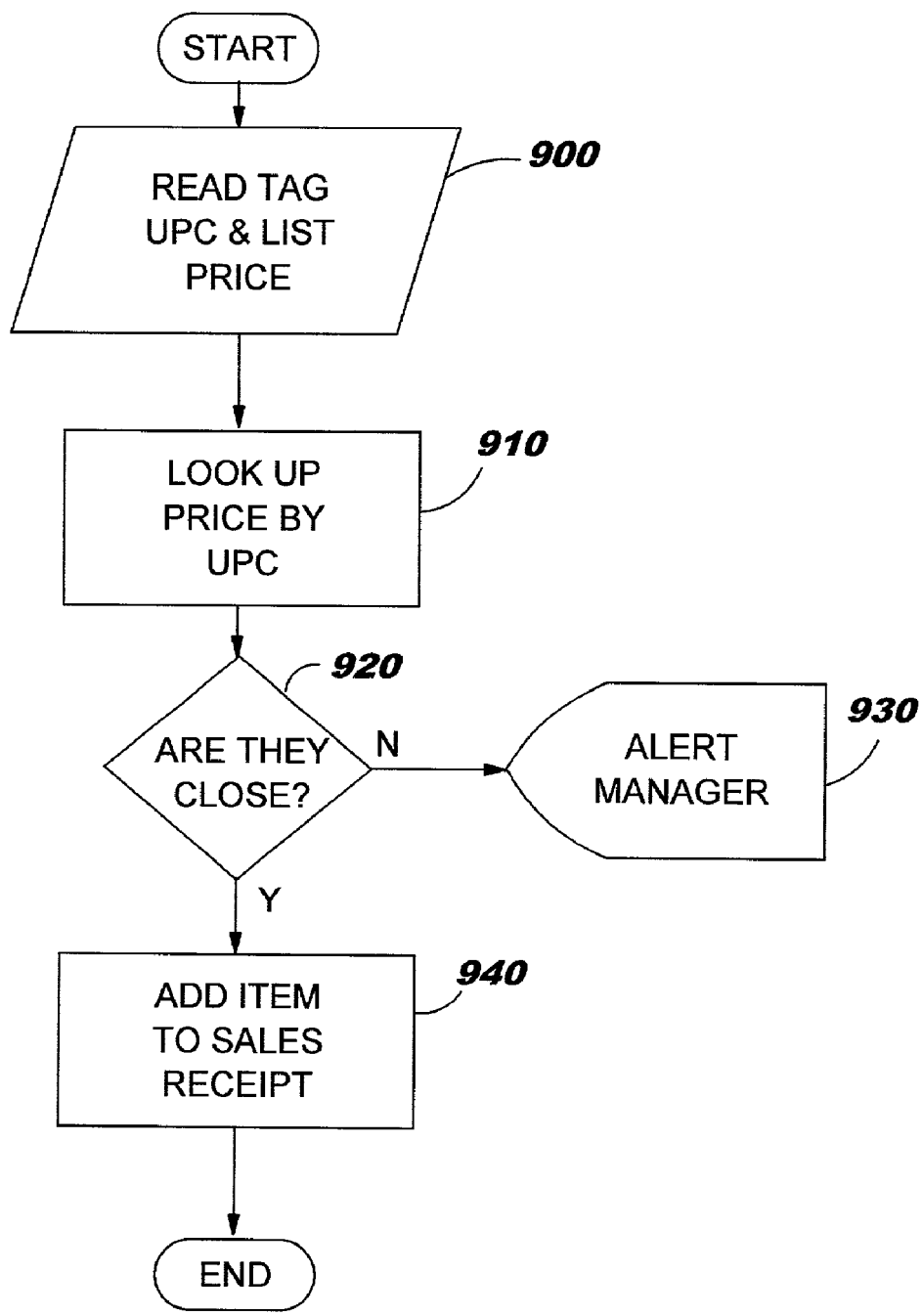
FIG. 9 is a flowchart depicting the process of adding an RFID-tagged item to a customer's order, in accordance with a preferred embodiment of the present invention.

FIG. 9 is a flowchart representation of the process a point-of-sale terminal would follow in adding a tagged item to the customer's order, in a preferred embodiment of the invention. First, the RFID tag is read to obtain the UPC and list price of the tagged item (step 900). Next, the actual retail price of the item is looked up in a database by using the UPC as a search key (step 910). If the price looked up from the database is sufficiently close to the list price stored on the tag (step 920), the item is added to the customer's sales receipt (step 940) and the customer is charged for the item. If the two prices are sufficiently different (step 920), the cashier is notified to alert a manager to the discrepancy (step 930), so that the customer is not overcharged for the item, for instance.

Figure 10:
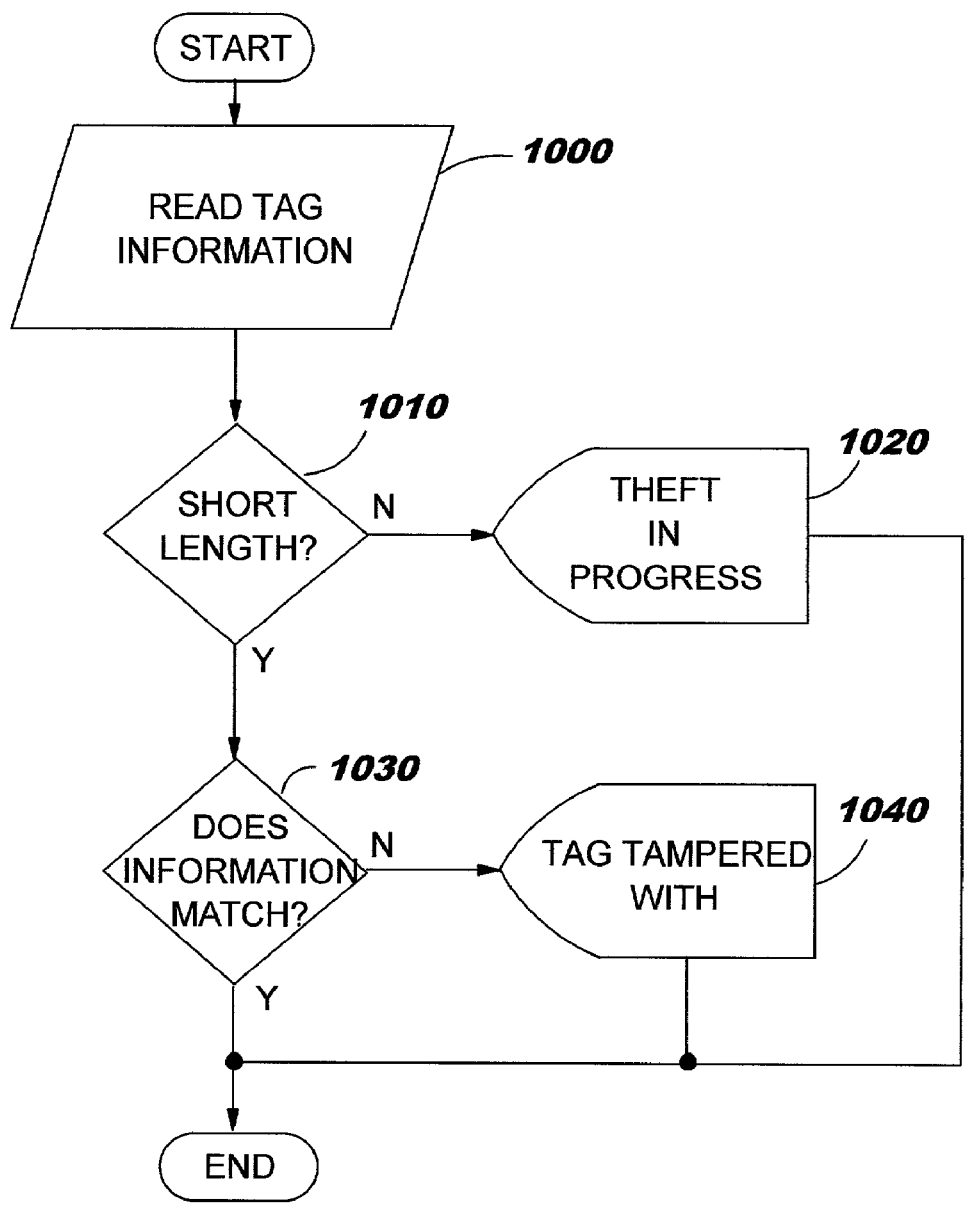
FIG. 10 is a flowchart depicting the process of theft/fraud detection in accordance with a preferred embodiment of the present invention.

FIG. 10 is a flowchart representation of the process the theft-detection portion of a preferred embodiment of the invention would follow in detecting theft or fraud. First the tracking number 406 (in FIG. 4A) is read from the RFID tag on a tagged item of merchandise (step 1000). This would normally occur using reader 350 placed before the exit 360 of a store (see FIG. 3). If the tracking number 406 has been given a short length (step 1010), this means that the item has had its tracking number overwritten (most likely because the item has been purchased). But if it has not, the item has not been purchased, and theft is detected (step 1020).

If the tracking number 406 has been given a short length (step 1010), then the tracking number 406 is compared with either store records or against the value stored in an RFID tag affixed to the customer's receipt, or both (step 1030). If they do not match, then the tagged item has had its tag tampered with, and store personnel are notified (step 1040).

A number of variations on the basic invention disclosed here have been contemplated. Possible variations include, but are not limited to the following.

The invention is not limited to using radio-frequency signals. Any kind of electromagnetic radiation, including visible and invisible light, could be used as a communications medium. In addition, sound waves (at an ultrasonic frequency, for instance) could also be used as a communications medium.

The physical embodiment of the invention is not limited to the use of electronic circuitry. For instance, research is currently being conducted in the area of optical computing components as a speedier alternative to electronic components. The present invention is applicable to such technology or to any other physical data processing technology that may be developed.

The physical embodiment is not limited to the use of monolithic semiconductor chip technology. Research is being conducted in the area of chipless RFID devices. The present invention is applicable to chipless RFID technology as well as to RFID devices utilizing a semiconductor chip.

The present invention could also include an ability for specially authorized users to manually modify the type and length information on an RFID tag. This would allow an organization with sufficient authority, like a retailer or manufacturer, the ability to reset a tag to its pre-purchase state. Many authentication and cryptographic schemes, such as secret sharing and various handshaking protocols, exist in the prior art to allow an authorized party access without compromising security. This feature would be useful for handling returned merchandise in a retail context, where tags need to be reset before the merchandise is returned to the retail floor.

The present invention is not limited to the retail context. Indeed, the basic goals of the present invention, namely protection against data tampering and against global tracking, are applicable in a number of contexts outside of the retail sector. For instance, the same technology could as easily be utilized in the context of a circulating library, where books are tagged with RFID tags. Information regarding the identity and ownership of a volume can be stored as read-only information and information about the book's circulation can be stored in a short-rewrite field that is reset to its pre-checkout length and value when returned to the library.

Another use for the present invention is for keeping track of a pharmaceutical inventory in a clinical setting. In a hospital or clinic, it is crucial that drugs are administered in the proper amounts, and that the hospital or clinic has an accurate assessment of their drug inventory at all times. By tagging pharmaceutical products with RFID tags in accordance with the present invention, a health care facility can ensure that accurate information regarding the inventory and usage of pharmaceutical products is maintained at all times.

It is important to note that while the present invention has been described in the context of a fully functional data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for secure electronic labeling, the method comprising:
   writing an entry to a memory as a triple having a type, a length, and a value, the memory being part of a machine-readable identification device that is part of an electronic label, wherein the type identifies a type of write access control rule that is to control overwriting the value written to the entry;
   selecting a first write access control rule from a plurality of write access control rules based on the type written in the entry in response to a request to write a rewrite value to the entry; and
   performing a write access to the entry according to the first write access control rule in response to the request to write the rewrite value to the entry.

2. The method of claim 1, wherein the machine-readable identification device comprises a radio-frequency identification (RPID) tag.

3. The method of claim 2, wherein the first access control rule is selected from the group comprising a read-only rule, an unlimited read-write rule, and a short write rule.

4. A method for secure electronic labeling, the method comprising:
   writing a value to a first memory having a length, the first memory being part of a machine-readable identification device;
   writing a type to a second memory in the machine-readable identification device; and
   imposing a first access control rule upon the first memory, wherein the first access control rule is that if the first memory is rewritten to, the length of the first memory is reduced to a predetermined size.

5. A method for secure electronic labeling, the method comprising:
   writing a value to a first memory having a length;
   a writing type to a second memory;
   reading a request to overwrite the first memory;
   disallowing overwriting of the first memory if the type is of a first kind;
   overwriting the first memory and shortening the length of the first memory if the type is of a second kind;
   overwriting the first memory with new data and adjusting the length of the first memory to fit the new data if the type is of a third kind.

6. The method of claim 5, wherein in the step of overwriting the first memory and shortening the length of the first memory, the length of the first memory is shortened to a predetermined size.

7. A method for secure electronic labeling, the method comprising:
   writing a universal product code entry to a first memory, the universal product code entry having a first type, a first length, and a first value, the first memory being part of a machine-readable identification device that is part of an electronic label;
   writing a list price entry to a second memory, the list price entry having a second type, a second length, and a second value, the second memory being part of the machine-readable identification device that is part of the electronic label;
   writing a tracking number entry to a third memory, the tracking number entry having a third type, a third length, and a third value, the third memory being part of the machine-readable identification device that is part of the electronic label;
   associating the first type with a first access control rule such that the first access control rule is imposed upon the first memory, in accordance with the first type, wherein the first access control rule controls overwriting of the first value written to the first memory;
   associating the second type with a second access control rule such that the second access control rule is imposed upon the second memory in accordance with the second type, wherein the second access control rule controls overwriting of the second value written to the second memory; and
   associating the third type with a third access control rule such that the third access control rule is imposed upon the third memory in accordance wit the third type, wherein the third access control rule controls overwriting of the third value written to the third memory.

8. The method of claim 7, wherein the machine-readable identification device is a radio-frequency identification (RFID) tag.

9. The method of claim 8, wherein the first access control rule is such that the first memory may not be rewritten to.

10. The method of claim 8, wherein the third access control rule is such that if the third memory is rewritten to, the third length is reduced to a predetermined size.

11. A method for secure electronic labeling, the method comprising the steps of:
    writing a value to a first memory having a length, the first memory being part of a machine-readable identification device;
    associating a type value with the first memory such that an access control rule is imposed upon the first memory, in accordance with the type value, wherein the access control rule is such that if, first memory is rewritten to, the length of the first memory is reduced to a predetermined size.

12. A computer program product for secure electronic labeling, the computer program product comprising:
    a computer usable medium having computer usable program code, said computer usable program code comprising:
      computer usable program code configured to write a value to a first memory having a length, the first memory being part of a machine-readable identification device;
      computer usable program code configured to write a type to a second memory in the machine-readable identification device; and
      computer usable program code configured to impose a first access control rule upon the first memory, wherein the first access control rule is that if the first memory is rewritten to, the length of to first memory is reduced to a predetermined size.

13. A computer program product for secure electronic labeling, the computer program product comprising:
    a computer usable medium having computer usable program code, said computer usable program code comprising:
      computer usable program code configured to write a value to a first memory having a length;
      computer usable program code configured to write a type to a second memory;
      computer usable program code configured to read a request to overwrite the first memory;

computer usable program code configured to disallow overwriting of the first memory if the type is of a first kind;
computer usable program code configured to overwrite the first memory and to shorten the length of the first memory if the type is of a second kind;
computer usable program code configured to overwrite the first memory with new data and to adjust the length of the first memory to fit the new data if the type is of a third kind.

14. The computer program product of claim 13, wherein the length of the first memory is shortened to a predetermined size.

15. A computer program product for secure electronic labeling, the computer program product comprising:
a computer usable medium having computer usable program code, said computer usable program code comprising:
computer usable program code configured to write a value to a first memory having a length, the first memory being part of a machine-readable identification device;
computer usable program code configured to associate a type value with the first memory such that an access control rule is imposed upon the first memory, in accordance with the type value, wherein the access control rule is such that if the first memory is rewritten to, the length of the first memory is reduced to a predetermined size.

16. An electronic label, comprising:
a communication unit;
a controller, configured to receive data from the communication unit;
a memory, having an entry stored therein, wherein the entry is a triple having a type, a length, and a value; wherein the memory is configured to be written to by the controller;
wherein the communication unit receives a rewrite value;
wherein the controller receives the rewrite value from the communication unit, the controller selects a first write access control rule from a plurality of write access control rules based on the type stored in the entry;
wherein the controller determines whether the rewrite value should be written to the memory, and if the controller determines that the value should be written to the memory, the controller writes the rewrite value to the memory.

17. The apparatus of claim 16, wherein the access control rule is such that once the value is written to the memory, to memory may not be rewritten to.

18. The apparatus of claim 17, wherein the apparatus is attached to a substrate.

19. The apparatus of claim 18, wherein the substrate is a flexible sheet material.

20. The apparatus of claim 18, wherein the substrate is an article of merchandise.

21. The apparatus of claim 18, wherein the substrate is an item of packaging.

22. The apparatus of claim 17, wherein to communication unit receives the value as an electromagnetic stimulus.

23. The apparatus of claim 22, wherein the electromagnetic stimulus comprises light.

24. The apparatus of claim 22, wherein the electromagnetic stimulus comprises radio waves.

25. The apparatus of claim 22, comprising a photoelectric cell, wherein the communication unit receives the value as an electromagnetic stimulus through the photoelectric cell.

26. The apparatus of claim 22, comprising an antenna, wherein the communication unit receives the value as an electromagnetic stimulus through the antenna.

27. The apparatus of claim 26, wherein the antenna comprises a capacitive antenna.

28. The apparatus of claim 17, wherein the access control rule is stored in a second memory.

29. The apparatus of claim 17, wherein the access control rule is embodied in a logic circuit.

30. The apparatus of claim 17, wherein the memory is configured to be read by the controller, and the communication unit is configured to receive data from the controller, and wherein the controller reads the value from the memory, the communication unit receives the value from the controller, and the communication unit transmits the value.

31. The apparatus at claim 30, wherein the communication unit transmits the value as electromagnetic radiation.

32. The apparatus of claim 31, wherein the electromagnetic radiation comprises light.

33. The apparatus of claim 31, wherein the electromagnetic radiation comprises radio waves.

34. The electronic label of claim 16, wherein the entry is a is a universal product code entry.

35. The electronic label of claim 34, wherein the first write access control rule is such that the entry may not be rewritten to.

36. The electronic label of claim 16, wherein the entry is a list price entry.

37. The electronic label of claim 36, wherein the first write access control rule is such that the entry may not be rewritten to.

38. The electronic label of claim 16, wherein the entry is a tracking number entry.

39. The electronic label of claim 38, wherein the first write access control rule is such that if the entry is rewritten to, the length of the entry is reduced to a predetermined size.

40. An apparatus for secure electronic labeling, comprising:
a communication unit;
a controller, configured to receive data from the communication unit;
a memory, having a length, and configured to be written to by the controller, wherein the communication unit receives a value, the controller receives the value from the communication unit, the controller evaluates an access control rule taken from a plurality of access control rules to determine whether the value should be written to the memory, and if the controller determines that the value should be written to the memory, the controller writes the value to the memory, wherein communication unit, controller, and memory are part of a same electronic label, and wherein the access control rule is such that the value is written to memory, but the length of the memory is reduced to a predetermined size.

41. The apparatus of claim 40, wherein the apparatus is attached to a substrate.

42. The apparatus of claim 41, wherein the substrate is a flexible sheet material.

43. The apparatus of claim 41, wherein the substrate is an article of merchandise.

44. The apparatus of claim 41, wherein the substrate is an item of packaging.

45. The apparatus of claim 40, wherein the communication unit receives the value as an electromagnetic stimulus.

46. The apparatus of claim 45, wherein the electromagnetic stimulus comprises light.

47. The apparatus of claim 45, wherein the electromagnetic stimulus comprises radio waves.

48. The apparatus of claim 45, comprising a photoelectric cell, wherein the communication unit receives the value as an electromagnetic stimulus trough the photoelectric cell.

49. The apparatus of claim 45, comprising an antenna, wherein the communication unit receives the value as an electromagnetic stimulus through the antenna.

50. The apparatus of claim 49, wherein the antenna comprises a capacitive antenna.

51. The apparatus of claim 40, wherein the predetermined size is three bytes.

52. The apparatus of claim 40, wherein the access control rule is stored in a second memory.

53. The apparatus of claim 40, wherein the access control rule is embodied in a logic circuit.

54. The apparatus of claim 40, wherein the memory is configured to be read by the controller, and the communication unit is configured to receive data from the controller, and wherein the controller reads the value from the memory, the communication unit receives the value from the controller, and the communication unit transmits the value.

55. The apparatus of claim 54, wherein the communication unit transmits the value as electromagnetic radiation.

56. The apparatus of claim 55, wherein the electromagnetic radiation comprises light.

57. The apparatus of claim 55, wherein the electromagnetic radiation comprises radio waves.

* * * * *

UNITED STATES PATENT AND TRADEMARK OFFICE
CERTIFICATE OF CORRECTION

PATENT NO.       : 7,000,834 B2                                     Page 1 of 1
APPLICATION NO. : 09/790104
DATED            : February 21, 2006
INVENTOR(S)      : John R. Hind et al.

It is certified that error appears in the above-identified patent and that said Letters Patent is hereby corrected as shown below:

<u>Column 9</u>
Line 40, replace "a writing" with --writing a--

<u>Column 10</u>
Line 17, replace "wit" with --with--
Line 36, replace "if," with --if the--
Line 54, replace "to" with --the--

<u>Column 11</u>
Line 49, replace "to" with --the--
Line 59, replace "to" with --the--

<u>Column 12</u>
Line 16, replace "at" with --of--
Line 50, insert --the-- between "wherein" and "communication"

<u>Column 13</u>
Line 5, replace "trough" with --through--

Signed and Sealed this

Eighth Day of August, 2006

JON W. DUDAS
*Director of the United States Patent and Trademark Office*